US012764204B2

(12) United States Patent
Lu

(10) Patent No.: US 12,764,204 B2
(45) Date of Patent: Oct. 13, 2026

(54) METHOD AND AN APPARATUS FOR DECOMPRESSION BACKUP

(71) Applicant: New H3C Technologies Co., Ltd., Hangzhou (CN)

(72) Inventor: Lansong Lu, Beijing (CN)

(73) Assignee: New H3C Technologies Co., Ltd., Hangzhou (CN)

( * ) Notice: Subject to any disclaimer, the term of this patent is extended or adjusted under 35 U.S.C. 154(b) by 36 days.

(21) Appl. No.: 19/096,016

(22) Filed: Mar. 31, 2025

(65) Prior Publication Data

US 2026/0189637 A1 Jul. 2, 2026

(30) Foreign Application Priority Data

Dec. 26, 2024 (CN) ......................... 202411951544.6

(51) Int. Cl.
*H04L 69/04* (2022.01)
*H04L 47/38* (2022.01)

(52) U.S. Cl.
CPC .............. *H04L 69/04* (2013.01); *H04L 47/38* (2013.01)

(58) Field of Classification Search
None
See application file for complete search history.

(56) References Cited

U.S. PATENT DOCUMENTS 8,780,811 B1 * 7/2014 Datta .................. H04L 41/0654 370/328
2006/0129689 A1 * 6/2006 Ho ........................ H04L 69/329 709/230
2012/0163180 A1 * 6/2012 Goel ..................... H04L 45/306 370/238
2014/0304352 A1 * 10/2014 Chaudhary ......... H04L 67/1029 709/208
2017/0324628 A1 * 11/2017 Dhanabalan ........ H04L 43/0852
2018/0077068 A1 * 3/2018 Dhanabalan ............ H04L 69/04
2019/0245783 A1 * 8/2019 Mithyantha ............. H04L 45/02

FOREIGN PATENT DOCUMENTS

CN 118524440 A * 8/2024 ............ H04W 40/34
WO WO-2024152689 A1 * 7/2024 ......... H04L 12/4641

OTHER PUBLICATIONS

European Patent Office, Extended European Search Report Issued in Application No. 25167284.6, Sep. 8, 2025, Germany, 12 pages.
State Intellectual Property Office of the People's Republic of China, Office Action and Search Report Issued in Application No. 202411951544.6, Sep. 26, 2025, 11 pages. (Submitted with English Translation).

* cited by examiner

*Primary Examiner* — Phyllis A Book
(74) *Attorney, Agent, or Firm* — McCoy Russell LLP

(57) ABSTRACT

According to a method for decompression backup, a compress node compresses and forwards packets to a master decompression node for decompression; and, in response to receiving a notification indicating that a decompression capability of the master decompression node is abnormal, the compress node switches packets to be decompressed by the master decompression node to a backup decompression node with normal decompression capability for decompression to achieve backup protection of the decompression nodes, thereby avoiding problems caused by decompression ability being abnormal, such as discarding data.

19 Claims, 3 Drawing Sheets

METHOD AND AN APPARATUS FOR DECOMPRESSION BACKUP

CROSS REFERENCE TO RELATED APPLICATION

This application claims priority to Chinese Patent Application No. 202411951544.6, filed on Dec. 26, 2024, which is incorporated herein by reference in its entirety for all purposes.

TECHNICAL FIELD

The present disclosure relates to network communication technology, and in particular to a method and an apparatus for implementing decompression backup, and an electronic device.

BACKGROUND

In specific applications, data transmission often occurs between two provider edge (PE) apparatuses. Taking the example of PE1 transmitting data to PE2 through a route reflector (RR) as shown in FIG. 1, PE1 serves as a compression node and compresses the data intended for PE2 prior to transmission. PE2, serving as a decompression node, receives the compressed data from PE1, decompresses the compressed data, and processes the decompressed data, such as forwarding the decompressed data.

However, in implementation, decompression capability often fails at the decompression node. Once the decompression node experiences a decompression capability failure, it is followed by many problems, such as data loss, due to lacking the decompression capability.

SUMMARY

The present disclosure provides a method, an apparatus, and an electronic device for implementing decompression backup to prevent issues such as data loss due to decompression failures.

Examples of the present disclosure provide a method for decompression backup, which is implemented to a provider edge (PE) apparatus designated as a compression end in a data center. The method includes:

- identifying a first packet matching a master flow specification policy corresponding to a master decompression node;
- compressing the first packet into a first compressed packet based on the master flow specification policy;
- redirecting the first compressed packet to an interface between the compression node and the master decompression node to forward the first compressed packet to the master decompression node for decompression;
- in response to determining that a notification indicating that a decompression capability of the master decompression node is abnormal is received,
- identifying a second packet matching a new master flow specification policy corresponding to a new master decompression node;
- compressing the second packet based on the new master flow specification policy to obtain a second compressed packet, and redirecting the second compressed packet to an interface between the compression node and the new master decompression node to forward the second compressed packet to the new master decompression node for decompression.

Another method for decompression backup which is implemented to a PE in a data center, where the PE is designated as one of the decompression ends adapted to the compression node. The method includes:

- determining that the present decompression node is selected by the compression node as a master decompression node,
- in response to determining that a decompression capability of the present decompression node is normal, receiving a first compressed packet redirected by the compression node and decompressing the first compressed packet; where the compression node is a node which compresses a first packet matching a flow specification policy corresponding to the master decompression node into the compressed packet and redirects the first compressed packet to the master decompression node;
- in response to determining the decompression capability of the present decompression node is abnormal, notifying the compression node, so that the compression node compresses a second packet, which matches a flow specification policy corresponding to a new master decompression node, into a second compressed packet and redirects the second compressed packet to an interface between the compression node and the new master decompression node so as to forward the second compressed packet to the new master decompression node for decompression.

An electronic device implemented to a provider edge (PE) apparatus designated as a compression node in a data center, comprising: a processor and a non-transitory machine-readable storage medium for storing computer instructions, wherein the computer instructions are executed by the processor to execute operations comprising:

- identifying a first packet matching a master flow specification policy corresponding to a master decompression node;
- compressing the first packet into a first compressed packet based on the master flow specification policy;
- redirecting the first compressed packet to an interface between the compression node and the master decompression node to forward the first compressed packet to the master decompression node for decompression;
- in response to determining that a notification indicating that a decompression capability of the master decompression node is abnormal is received,
- identifying a second packet matching a new master flow specification policy corresponding to a new master decompression node;
- compressing the second packet based on the new master flow specification policy to obtain a second compressed packet, and redirecting the second compressed packet to an interface between the compression node and the new master decompression node to forward the second compressed packet to the new master decompression node for decompression.

Another electronic device implemented to a provider edge (PE) apparatus designated as one of decompression nodes adapted to a compression node in a data center, comprising: a processor and a non-transitory machine-readable storage medium for storing computer instructions, wherein the computer instructions are executed by the processor to execute the above corresponding method.

From the above technical solutions, it may be seen that the examples of the present disclosure realize a method for backup protection between decompression nodes, enabling the compression node to compress and forward packets to the master decompression node for decompression in response to determining that the decompression capability of the master decompression node is normal; and, in response to determining that the decompression capability of the master decompression node is abnormal, switch packets originally to be decompressed by the master decompression node to one of the backup decompression nodes with normal decompression capability for decompression at a high speed, thereby avoiding problems caused by decompression ability being abnormal, such as discarding data.

BRIEF DESCRIPTION OF DRAWINGS

The drawings herein are incorporated into the specification and constitute a part thereof, illustrating examples in accordance with the present disclosure and serving, together with the specification, to explain the principles of the present disclosure.

DETAILED DESCRIPTION

Figure 1:
FIG. 1 is a schematic diagram of data transmission between PEs.

Here, exemplary examples will be described in detail, with examples illustrated in the drawings. Unless otherwise indicated, the same numerals in different drawings represent the same or similar elements. The examples described in the following exemplary examples do not represent all examples consistent with the present disclosure. Rather, they are merely examples of apparatuses and methods consistent with some aspects of the present disclosure, as detailed in the appended claims.

The terminology used in this disclosure is for the purpose of describing particular examples only and is not intended to be limiting of the present disclosure. The singular forms "a," "said," and "the" used in this disclosure and the appended claims are intended to include the plural forms unless the context clearly indicates otherwise.

To better understand the technical solutions provided by the examples of the present disclosure and make the objectives, features, and advantages of the examples of the present disclosure more apparent and comprehensible to those skilled in the art, further detailed descriptions of the technical solutions in the examples of the present disclosure are provided below in conjunction with the drawings.

Figure 2:
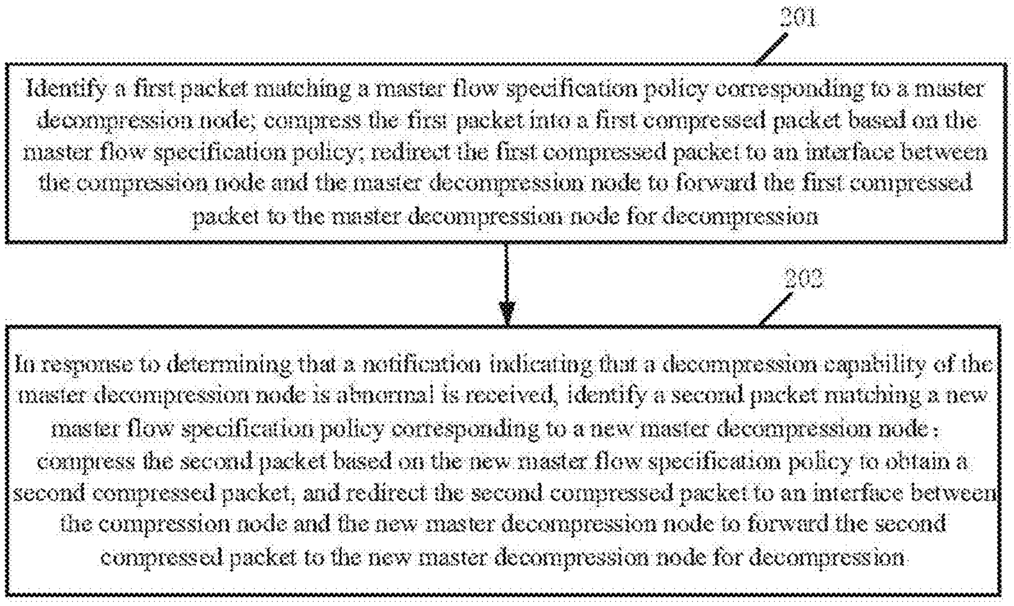
FIG. 2 is a schematic diagram of a method provided in an example of the present disclosure.

Refer to FIG. 2, which is a schematic diagram of a method provided by an example of the present disclosure. This method is implemented to a provider edge (PE) designated as the compression node in a data center. In this example, a plurality of PEs are designated as decompression nodes adapted to the compression node based on actual needs. Here, the plurality of decompression nodes may be in the same data center.

As an example, the plurality of decompression nodes and the compression node may be in the same data center or in different data centers, which is not limited in this example.

As shown in FIG. 2, the method may include the following processes.

In process 201, a first packet matching a master flow specification policy corresponding to a master decompression node is identified; the first packet is compressed into a first compressed packet based on a master flow specification policy; the first compressed packet is redirected to an interface between the compression node and the master decompression node to forward the first compressed packet to the master decompression node for decompression.

In an example, prior to process 201, the method may further include receiving flow specification policies respectively sent by multiple decompression nodes.

In this example, a flow specification policy sent by each of the decompression nodes is to instruct the compression node to compress packets matching the flow specification policy and redirect the packets to the decompression node for decompression. Examples will be described later.

In this example, the compression node selects one of the multiple decompression nodes as a master decompression node and the remaining decompression nodes as backup decompression nodes based on the flow specification policies sent by each decompression node.

As an example, there are many ways to select one of the multiple decompression nodes as a master decompression node, such as selecting one based on a predetermined selection rule for the master decompression node, or based on the lowest internet protocol (IP) address, etc, which is not limited by this example.

After selecting one of the multiple decompression nodes as the master decompression node, the remaining decompression nodes are designated as backup decompression nodes. Based on this, as an example, in response to determining that the decompression capability of the master decompression node is normal, the compression node compresses a packet matching the flow specification policy sent by the master decompression node and redirects it to an interface between the compression node and the master decompression node, so as to forward the packet to the master decompression node for decompression.

In process 202, in response to determining a notification indicating that the decompression capability of the master decompression node is abnormal is received, a second packet matching a new master flow specification policy corresponding to a new master decompression node is identified; the second packet is compressed based on the new master flow specification policy to obtain a second compressed packet, and the second compressed packet is redirected to an interface between the compression node and the new master decompression node to forward the second compressed packet to the new master decompression node for decompression.

As an example, the new master decompression node here may be one of the backup decompression nodes of the master decompression node with normal decompression capability. The flow specification policy corresponding to the new master decompression node is the new master flow specification policy.

It can be seen from the process in FIG. 2 that, this example implements a method for backup protection between decompression nodes, where a first packet matching a master flow specification policy corresponding to a master decompression node is identified, the first packet is compressed into a first compressed packet based on the master flow specification policy and the first compressed packet is redirected to an interface between the compression node and the master decompression node to forward the first compressed packet to the master decompression node for decompression; in response to determining a notification indicating that the decompression capability of the master decompression node is abnormal is received, the packet originally to be decompressed by the master decompression node is switched at a high speed to one of the backup decompression nodes of the master decompression node with normal decompression capability for decompression, thereby avoiding problems caused by decompression ability being abnormal, such as discarding data.

The following provides a detailed description of the process shown in FIG. 2.

Figure 3:
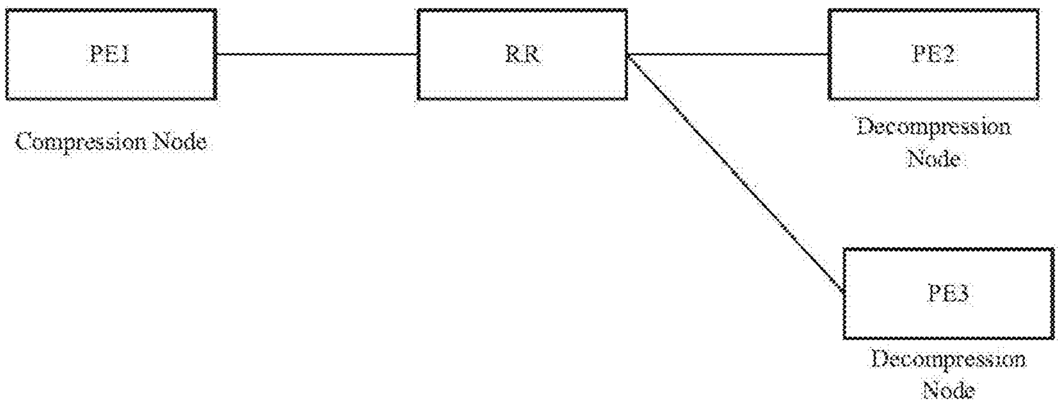
FIG. 3 is a schematic diagram of an application networking provided in an example of the present disclosure.

Taking IPv4 (Internet Protocol Version 4) as an example, with IPv6 (Internet Protocol Version 6) being similar. As shown in FIG. 3, assuming that the compression node is PE1, there are two decompression nodes adapted to the compression node, named PE2 and PE3.

As an example, each decompression node is configured with a flow routing configuration, which is denoted as flow-route. As an example, the flow-route configured for any decompression node includes: a wide area application services (WAAS) configuration (also known as compression configuration), a redirect configuration, and an operation matching rule.

Where the WAAS configuration, also known as compression configuration, includes subcard information. In this example, the subcard information includes identifiers of subcards to perform local compression and local decompression, such as slot numbers. For example, subslot1 and subslot2 of slot4 represent subcards to perform compression and decompression.

In this example, the redirect configuration in the flow-route sent by any decompression node includes a redirect next hop. As an example, the redirect next hop included in the redirect configuration of the flow-route sent by any decompression node is to be carried in the flow specification policy forwarded by the decompression node later, so that the compression node may determine the decompression node based on the flow specification policy. As an example, the redirect next hop here may be represented by a loopback address of the decompression node, among others. For example, the redirect next hop is 888::888 color 00:1.

In this example, the operation matching rule may include a five-tuple, such as a protocol identifier, a source IP address, a destination IP address, a source port number, and a destination port number. The protocol identifier here may not be limited, such as a user datagram protocol (UDP protocol) identifier 17, a transmission control protocol (TCP protocol) identifier 6, etc., and this example does not limit the protocol identifier. For example, the operation matching rule is: destination IP address 23.0.0.0 255.0.0.0, source IP address 11.0.0.0 255.0.0.0, protocol number (protocol) 17, destination port number 1024, and source port number 1.

In this example, each decompression node generates a flow specification policy based on the locally configured flow-route and sends the flow specification policy to the compression node.

In response to determining that the flow specification policies sent by the decompression nodes are received, the compression node selects one decompression node as the master decompression node, with the remaining decompression nodes serving as backup decompression nodes. The specific selection method is described above.

In this example, the compression node generates a master flow specification route based on the master flow specification policy.

Here, the flow specification route may include a compression policy and a redirection policy.

The compression policy has a compression operation matching rule and is to instruct compressing packets matching the compression operation matching rule.

The redirection policy has a redirection operation matching rule; the redirection policy is to instruct redirecting compressed packets matching the redirection operation matching rule to the interface between the compression node and the master decompression node.

In some examples, the compression operation matching rule and the redirection operation matching rule may be different. For example, the compression operation matching rule at least includes a first protocol identifier, while the redirection operation matching rule at least includes a second protocol identifier; the first protocol identifier and the second protocol identifier are different, with the second protocol identifier being an identifier of a compression protocol, such as 108, while the first protocol identifier in the compression operation matching rule may be a UDP protocol identifier 17, a TCP protocol identifier 6, etc.

In this example, parameters other than the protocol identifiers may be the same in the compression operation matching rule and the redirection operation matching rule. These parameters may include the source IP address, the destination IP address, the source port number, and the destination port number. This example does not limit these parameters.

As shown in FIG. 3, in response to determining that PE1, designated as the compression node, receives flow specification policies sent by PE2 and PE3, designated as decompression nodes, respectively, PE1 selects one of them as the master decompression node and the remaining PE as the backup decompression node.

Taking PE1 selecting PE2 as the master decompression node and PE3 as the backup decompression node as an example, PE1 generates a flow specification route, which is denoted as flow specification route 1_2, based on the flow specification policy advertised by PE2 and distributes flow specification route 1_2 to the hardware.

Flow specification route 1_2 may include a compression policy and a redirection policy.

Where the compression operation matching rule corresponding to the compression policy in flow specification route 1_2 is, for example:

destination IP: 23.0.0.0 255.0.0.0;
destination port: 1024;
protocol: 17;
source IP: 11.0.0.0 255.0.0.0;
source port: 1.

The redirection operation matching rule corresponding to the redirection policy in flow specification route 1_2 is, for example:

destination IP: 23.0.0.0 255.0.0.0;
destination port: 1024;
protocol: 108;
source IP: 11.0.0.0 255.0.0.0;
source port: 1.

The interface redirected to based on the redirection policy in flow specification route 1_2 is the interface corresponding to the following identifier: forwarding ID: 2150629380, which indicates that the packet is redirected to the SRv6 TE policy tunnel between PE1 and PE2 so that the packet is forwarded to PE2 for decompression.

In some examples, PE1 also generates, based on the flow specification policy advertised by PE3, a corresponding flow specification route, which is denoted as flow specification route 1_3, and stores flow specification route 1_3 temporarily. In this example, among the flow specification route generated based on the flow specification policy corresponding to the master decompression node and the flow specification route generated based on the flow specification policy corresponding to the backup decompression node, the compression operation matching rules corresponding to the compression policies are the same. In some examples, among the flow specification route generated based on the flow specification policy corresponding to the master decompression node and the flow specification route generated based on the flow specification policy corresponding to the backup decompression node, the redirection operation matching rules corresponding to the redirection policies are also the same.

In this example, the aforementioned redirection policy may include an interface redirected to, and interfaces redirected to by different redirection policies are different. For example, in the flow specification route corresponding to PE2, the interface redirected to by the redirection policy may be the interface corresponding to the following interface identifier: forwarding ID 2150629380, which indicates that the packet is redirected to the SRv6 TE policy tunnel between PE1 and PE2, while in the flow specification route corresponding to PE3, the interface redirected to by the redirection policy may be the interface corresponding to the following interface identifier: forwarding ID 2150629381, which indicates that the packet is redirected to the SRv6 TE policy tunnel between PE1 and PE3 so as to forward the packet to PE3 for decompression.

For example, the compression operation matching rule within the compression policy in the flow specification route corresponding to PE3, which is denoted as flow specification route 1_3, is, for example:

destination IP: 23.0.0.0 255.0.0.0;
destination port: 1024;
protocol: 17;
source IP: 11.0.0.0 255.0.0.0;
source port: 1.

The redirection operation matching rule within the redirection policy in flow specification route 1_3 is, for example:

destination IP: 23.0.0.0 255.0.0.0;
destination port: 1024;
protocol: 108;
source IP: 11.0.0.0 255.0.0.0;
source port: 1.

The interface redirected to by the redirection policy in flow specification route 1_3 may be the interface corresponding to the following interface identifier: forwarding ID: 2150629381, which indicates redirection to the segment routing over IPv6 traffic engineering (SRv6 TE) policy tunnel between PE1 and PE3 for forwarding to PE3 for decompression.

Figure 4:
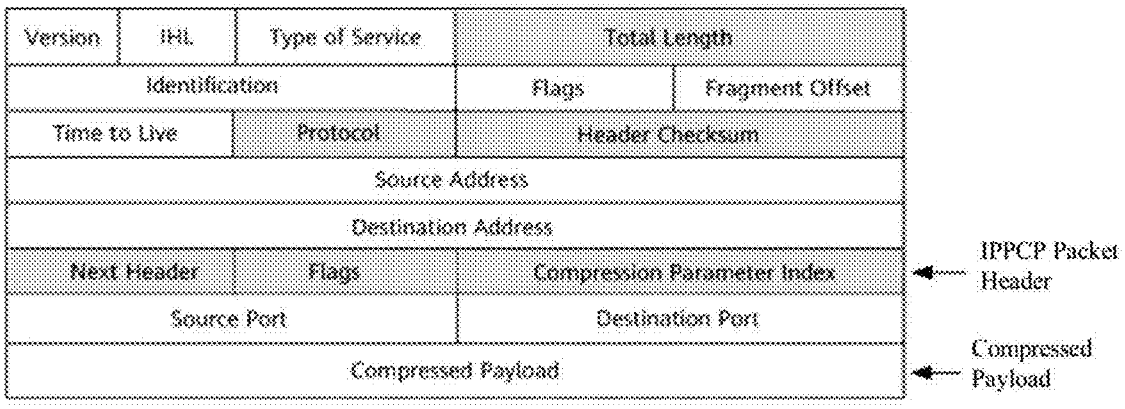
FIG. 4 is a schematic diagram of a compressed packet format provided in an example of the present disclosure.

As shown in FIG. 3, in response to determining that the compression node PE1 receives an IPv4 packet, the compression node PE1 identifies that the IPv4 packet matches the compression operation matching rule in the flow specification route 1_2, and then directs the IPv4 packet to a local subcard for compression. The format of the compressed packet is shown in FIG. 4. Later, the compressed packet is sent back from the subcard to the network processing unit (NP) within the compression node PE1. In response to determining the arrival of the compressed packet at the NP, the compression node identifies that the compressed packet matches the redirection operation matching rule in the flow specification route 1_2, and based on the redirection operation matching rule, redirects the compressed packet to the SRv6 TE policy tunnel between PE1 and PE2, and the compressed packet is at last sent to PE2 for decompression.

In this example, in response to determining that all the subcards bound to PE2 as the master decompression node for decompression fail, i.e., PE2's decompression capability fails, PE2 will notify PE1 serving as the compression node. In response to determining that this notification is received, PE1 considers that the decompression capability of the master decompression node is detected to be abnormal. Thereafter, PE1, designated as the compression node, selects one of the backup decompression nodes with normal decompression capability as the new master decompression node. For example, PE1 selects PE3 as the new master decompression node. Later, PE1 switches the originally optimal flow specification route stored in local hardware (i.e., the master flow specification route corresponding to the master decompression node with abnormal decompression capability) to the new flow specification route corresponding to the newly selected master decompression node at a high speed, i.e., PE3. For instance, PE1 distributes the new master flow specification route corresponding to the new master decompression node, PE3, to the local hardware to replace the master flow specification route corresponding to the original master decompression node with abnormal decompression capability, PE2. The new master flow specification route corresponding to PE3 is as described above.

Thereafter, as shown in FIG. 3, in response to determining that an IPv4 packet is received, the compression node PE1 identifies that the IPv4 packet matches the compression operation matching rule in the new master flow specification route 1_3, and directs the IPv4 packet to a local subcard for compression. The format of the compressed packet is shown in FIG. 4. Later, the compressed packet is sent back from the subcard to the NP within the compression node PE1. In response to determining arrival of the compressed packet at the NP, the compression node PE1 identifies that the compressed packet matches the redirection operation matching rule in the new master flow specification route 1_3, and based on the redirection operation matching rule, redirects the compressed packet to the SRv6 TE policy tunnel between PE1 and PE3, and at last the compressed packet is sent to PE3 for decompression. This achieves the rapid switching of packets originally to be decompressed by the master decompression node to one of its backup decompression nodes with normal decompression capability in the event of the decompression capability of the master decompression node being abnormal, thereby avoiding problems caused by decompression ability being abnormal, such as discarding data.

Below is a description of the format of the compressed packet.

In this example, the compression of packets, such as IPv4 packets, may be implemented using an IP-layer compression protocol, such as the IP payload compression protocol (IPComp or IPPCP). IPPCP compression is lossless, meaning that the packet remains the same after compression and decompression. Additionally, IPPCP compression is stateless, with the compression and decompression of each packet not depending on other packets, and without concern for packet disorder or loss, as each packet is encapsulated separately after compression.

IPPCP is a low-level compression protocol for IP-layer data packets. Unlike standard IP packets, the payload of an IPPCP-compressed packet is compressed by IPPCP.

IPPCP may achieve packet compression by inserting IPPCP's own protocol header, hereinafter referred to as the "IPPCP header", and modifying individual fields of the packet, such as IPv4 or IPv6 packets. The IPPCP header contains the following three fields: Next Header, Flags, and Compression Parameter Index.

Table 1 below provides examples of explanations for each field in the IPPCP header:

TABLE 1

| Name of the Field | Length | Meaning |
|---|---|---|
| Next Header | 8 bit | Next header, such as the Protocol field that may identify the original IPv4 packet or the Next Header field in the IPv6 packet. |
| Flags | 8 bit | Reserved for future use. Here, the flags may be set as 0. |
| Compression Parameter Index | 16 bit | To identify compression algorithms, for example, values 0-63 are designated for well-known compression algorithms that require no additional information; values 64-255 are reserved for future use. |

Taking an IPv4 packet as an example, the format of the compressed packet obtained by compressing the IPv4 packet based on IPPCP is shown in FIG. 4. As illustrated in FIG. 4, in addition to that the IPPCP packet header shown in the aforementioned Table 1 is inserted into the compressed packet, the values of the following three original fields in the IPv4 packet have also changed.

Total Length field, refers to the length of the entire encapsulated IP data packet, which includes the IP header, the IPPCP header, and the compressed payload.

Protocol field, is set to 108, indicating that the protocol type is IPPCP.

IP Header Checksum field, is to confirm whether the IP header has changed or not after being transmitted to the receiving end.

Figure 5:
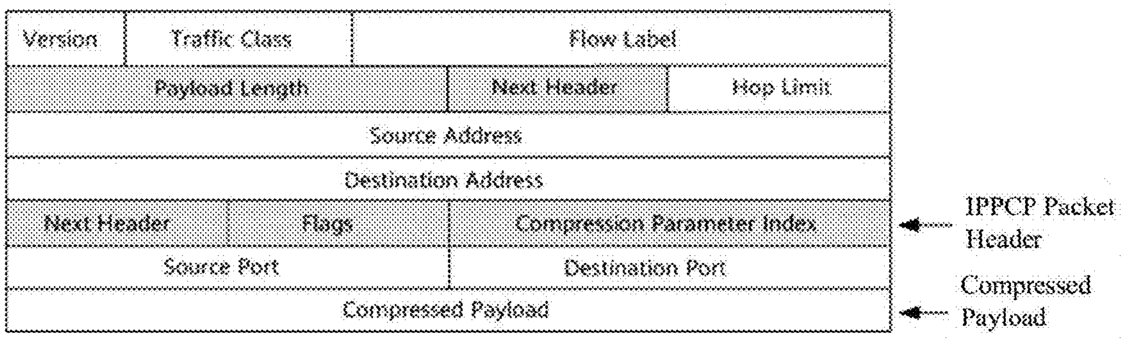
FIG. 5 is a schematic diagram of another compressed packet format provided in an example of the present disclosure.

Taking an IPv6 packet as another example, the format of the compressed packet obtained by compressing the IPv6 packet based on IPPCP is shown in FIG. 5. As illustrated in FIG. 5, in addition to that the IPPCP packet header shown in the aforementioned Table 1 is inserted into the compressed packet, the values of the following two original fields in the IPv6 packet have also changed.

Payload Length field, indicates the length of the compressed payload.

Next Header field, is set to 108, indicating that the protocol type is IPPCP.

The above description is presented from the perspective of the compression node for the example of the present disclosure. Next, the example of the present disclosure will be described from the perspective of the decompression node.

Figure 6:
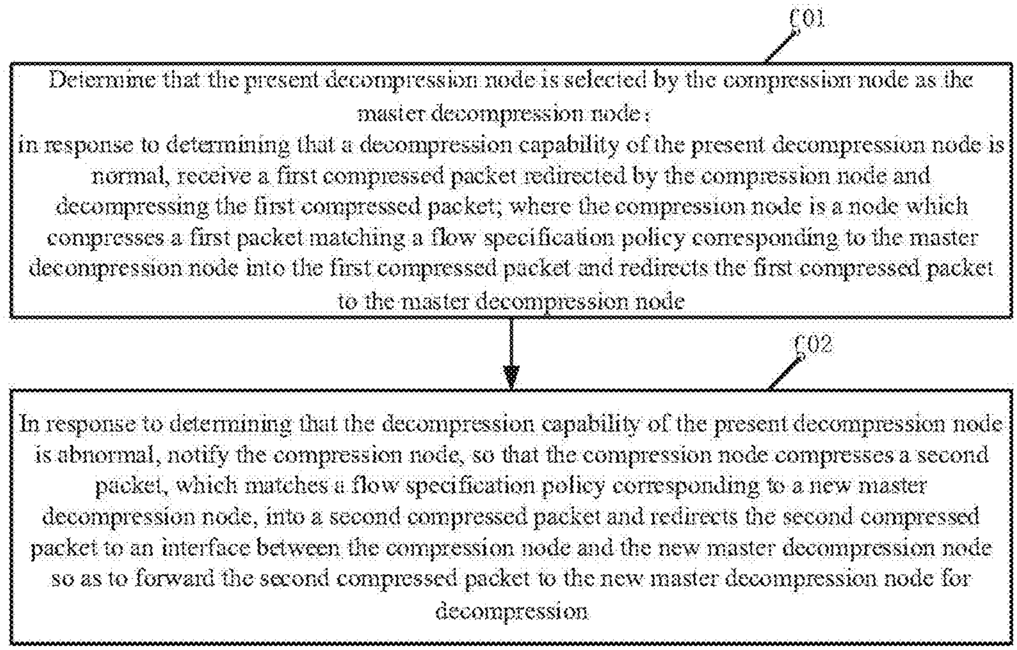
FIG. 6 is a schematic diagram of another method provided in an example of the present disclosure.

Please refer to FIG. 6, which provides a schematic diagram of another method in the example of the present disclosure. This method is implemented to a PE in a data center, and the PE is designated as one of the decompression nodes adapted to the compression node. The method includes the following processes.

In process 601, in a case where the present decompression node is selected by the compression node as the master decompression node, in response to determining the decompression capability of the present decompression node is normal, the present decompression node receives a first compressed packet redirected by the compression node and decompresses the first compressed packet; where the compression node is a node which compresses a first packet matching the flow specification policy corresponding to the master decompression node into the first compressed packet and redirects the first compressed packet to the master decompression node.

The process 601 corresponds to the aforementioned process 201.

In process 602, in response to determining the decompression capability of the present decompression node is abnormal, the present decompression node notifies the compression node, so that the compression node identifies a second packet, which matches a new master flow specification policy corresponding to a new master decompression node, compresses the second packet into a second compressed packet based on the new master flow specification policy and redirects the second compressed packet to an interface between the compression node and the new master decompression node so as to forward the second compressed packet to the new master decompression node for decompression.

The process 602 corresponds to process 202.

So far, the process shown in FIG. 6 is completed.

The above provides a description of the method provided in the example of the present disclosure. Next, a description of the apparatus provided in the example of the present disclosure is given.

Figure 7:
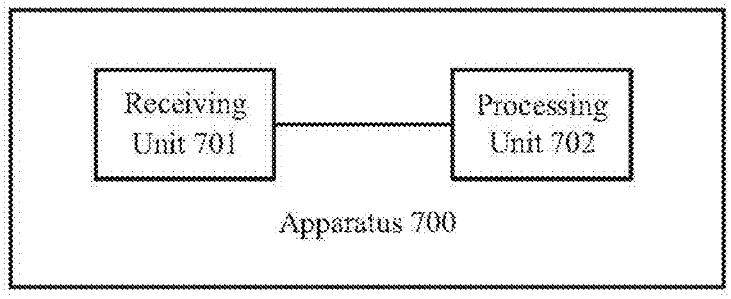
FIG. 7 is a schematic diagram of an apparatus provided in an example of the present disclosure.

Please refer to FIG. 7, which provides a schematic diagram of the apparatus in the example of the present disclosure. This apparatus 700 is implemented to a PE designated as the compression node in a data center. The apparatus 700 includes:

a receiving unit 701, is for receiving packets.

a processing unit 702, is for identifying a first packet matching a master flow specification policy corresponding to a master decompression node; compressing the first packet into a first compressed packet based on the master flow specification policy; redirecting the first compressed packet to an interface between the compression node and the master decompression node to forward the first compressed packet to the master decompression node for decompression; and in response to determining that a notification indicating that a decompression capability of the master decompression node is abnormal is received, identifying a second packet matching a new master flow specification policy corresponding to a new master decompression node, compressing the second packet based on the new master flow specification policy to obtain a second compressed packet, and redirecting the second compressed packet to an interface between the compression node and the new master decompression node to forward the second compressed packet to the new master decompression node for decompression.

In some examples, the processing unit further receives flow specification policies respectively sent by multiple decompression nodes; wherein the flow specification policy sent by each decompression node is to instruct the compression node to compress packets matching the flow specification policy and redirect the packets to the decompression node for decompression;

selects one from the multiple decompression nodes as the master decompression node, and takes other decompression nodes as backup decompression nodes of the master decompression node;

wherein the flow specification policy corresponding to the master decompression node is the master flow specification policy.

In some examples, the processing unit further generates a master flow specification route based on the master flow specification policy and configures the master flow specification route to local hardware; where the master flow specification route is to guide the compression node to compress the first packet into the first compressed packet by using the master flow specification route and redirect the first compressed packet to the interface between the compression node and the master decompression node, so as to forward the first compressed packet to the master decompression node for decompression;

the identifying the first packet matching the master flow specification policy corresponding to the master decompression node comprises: identifying the first packet matching the master flow specification route;

the compressing the first packet into the first compressed packet based on the master flow specification policy includes:

compressing the first packet based on the master flow specification route to obtain the first compressed packet.

In some examples, the processing unit further generates backup flow specification routes corresponding to the backup decompression nodes based on the flow specification policies corresponding to the backup decompression nodes;

the identifying the second packet matching the new master flow specification policy corresponding to the new master decompression node includes: selecting one from the backup decompression nodes as the new master decompression node, wherein the backup flow specification route corresponding to the selected backup decompression node is designated as the new master flow specification route corresponding to the new master decompression node;

configuring the new master flow specification route to the local hardware to replace the master flow specification route; and identifying the second packet matching the new master flow specification route;

the compressing the second packet based on the new master flow specification policy to obtain the second compressed packet includes:

compressing the second packet based on the new master flow specification route to obtain the second compressed packet.

In some examples, the master flow specification route corresponding to the master decompression node includes a compression policy and a redirection policy;

wherein the compression policy has a compression operation matching rule and is to instruct compressing packets matching the compression operation matching rule;

The redirection policy has a redirection operation matching rule; and the redirection policy is to instruct redirecting compressed packets matching the redirection operation matching rule to the interface between the compression node and the master decompression node.

The compression operation matching rule comprises a first protocol identifier, and the redirection operation matching rule comprises a second protocol identifier. The first protocol identifier and the second protocol identifier are different, and the second protocol identifier is an identifier of a compression protocol.

In some examples, in the flow specification route corresponding to the master decompression node and the flow specification routes corresponding to the backup decompression nodes, the compression operation matching rules are the same.

The redirection operation matching rules, which are comprised in the flow specification route corresponding to the master decompression node and the flow specification routes corresponding to the backup decompression nodes, are the same.

The redirection policy comprises an interface redirected to; different redirection policies include different interfaces redirect to.

In some examples, the compressing the first packet into the first compressed packet based on the master flow specification route includes:

determining that the first packet matches the compression operation matching rule in the master flow specification route, and compressing the first packet to obtain the first compressed packet.

The redirecting the first compressed packet to an interface between the compression node and the master decompression node to forward the first compressed packet to the master decompression node for decompression comprises: in response to determining that the first compressed packet matches the redirection operation matching rule in the master flow specification route, redirecting the first compressed packet to the interface between the compression node and the master decompression node based on the redirection policy in the master flow specification route, so that the first compressed packet is sent to the master decompression node.

So far, the structural description of the apparatus shown in FIG. 7 is completed.

Figure 8:
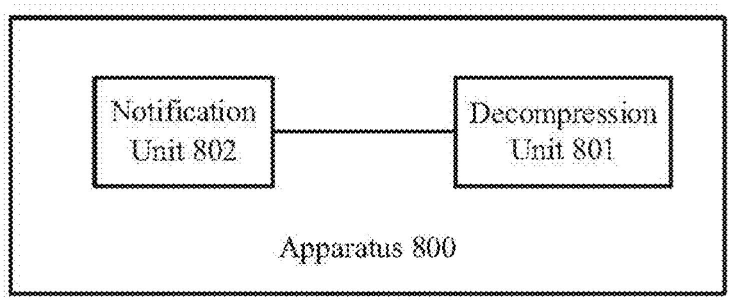
FIG. 8 is a schematic diagram of another apparatus provided in an example of the present disclosure.

Referring to FIG. 8, which is schematic diagram of another apparatus provided in an example of the present disclosure. The apparatus 800 is implemented to a PE in a data center, where the PE is designated as one of the decompression nodes adapted to the compression node. The apparatus 800 includes the following.

A decompression unit 801 is for determining that the decompression node is selected by the compression node as the master decompression node, and in response to a determination that the decompression capability of the present decompression node is normal, receiving a first compressed packet redirected by the compression node and decompressing the first compressed packet; where the compression node is a node which compresses a first packet matching a flow specification policy corresponding to the master decompression node into the first compressed packet and redirects the first compressed packet to the master decompression node.

A notification unit 802 is for, in response to a determination that the decompression node is selected by the compression node as the master decompression node and that the decompression capability of the decompression node is abnormal, notifying the compression node, so that the compression node compresses a second packet, which matches a flow specification policy corresponding to a new master decompression node, into a second compressed packet and redirects the second compressed packet to an interface between the compression node and the new master decompression node for forwarding to the new master decompression node for decompression.

Figure 9:
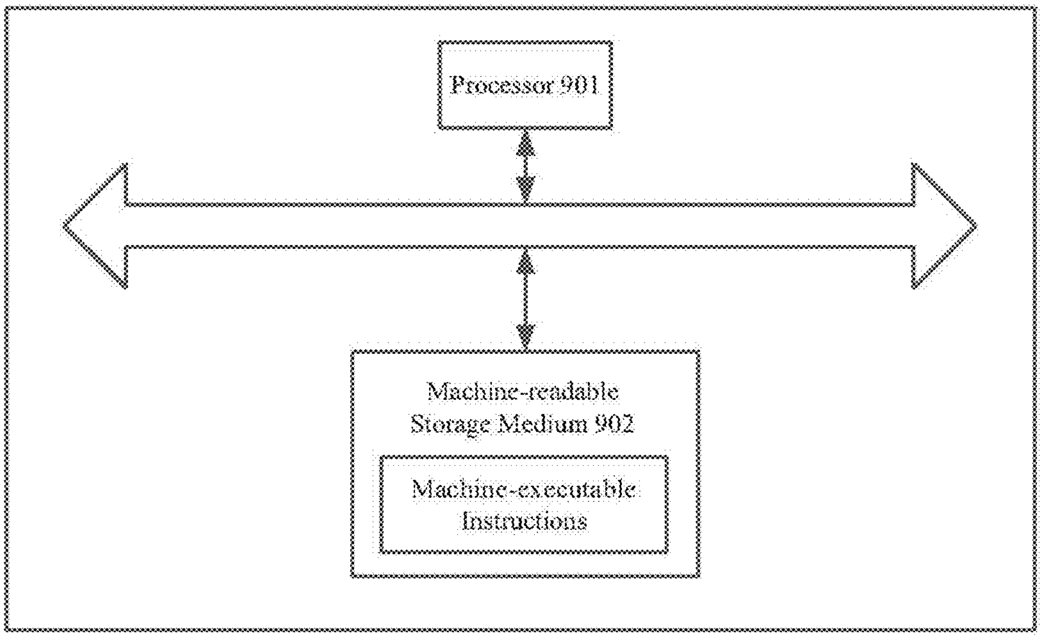
FIG. 9 is a schematic diagram of an electronic device provided in an example of the present disclosure.

Based on the same application concept as the aforementioned method, an example of the present disclosure further provides a hardware structure of the apparatus shown in FIG. 7 or FIG. 8. As shown in FIG. 9, the hardware structure includes: a processor 901 and a machine-readable storage medium 902. Computer instructions are stored on the machine-readable storage medium, and the computer instructions may be executed by the processor to implement the method disclosed in the aforementioned examples of the present disclosure.

Based on the same application concept as the aforementioned method, an example of the present disclosure further provides a machine-readable storage medium, on which a plurality of computer instructions are stored. The computer instructions may be executed by the processor to implement the method disclosed in the aforementioned examples of the present disclosure.

Exemplarily, the aforementioned machine-readable storage medium may be any electronic, magnetic, optical, or other physical storage apparatus capable of containing or storing information, such as executable instructions, packets, and the like. For example, the machine-readable storage medium may be Random Access Memory (RAM), volatile memory, non-volatile memory, flash memory, storage drives (such as hard disk drives), solid-state drives, any type of storage disk (such as optical disks, DVDs, etc.), or similar storage media, or combinations thereof.

The systems, apparatus, modules, or units clarified in the aforementioned examples may be implemented by computer chips or entities, or by products having certain functions. A typical example apparatus is a computer, which may be in the form of a personal computer, laptop computer, cellular phone, camera phone, smartphone, personal digital assistant, media player, navigation apparatus, email apparatus, game console, tablet computer, wearable apparatus, or a combination of any several of these apparatuses.

For the convenience of description, the above apparatus is described in separate units based on functionality. Of course, when applying the present disclosure, the functions of the units may be implemented in one or more software and/or hardware.

Those skilled in the art should understand that examples of the present disclosure may be provided as methods, systems, or computer program products. Therefore, the present disclosure may take the form of a pure hardware example, a pure software example, or an example combining software and hardware aspects. Furthermore, examples of the present disclosure may take the form of a computer program product implemented on one or more computer-usable storage media (including but not limited to disk memory, CD-ROM, optical memory, etc.) that contain computer-usable program code.

The present disclosure is described with reference to schematic diagrams and/or block diagrams of methods, apparatus (systems), and computer program products based on examples of the present disclosure. It should be understood that each flow and/or block in the schematic diagrams and/or block diagrams, and combinations of flows and/or blocks in the schematic diagrams and/or block diagrams, may be implemented by computer program instructions. These computer program instructions may be provided to a processor of a general-purpose computer, a special-purpose computer, an embedded processor, or other programmable data processing apparatus to produce a machine, such that the instructions, which are executed via the processor of the computer or other programmable data processing apparatus, create means for implementing the functions specified in one or more flows and/or one or more blocks in the schematic diagrams and/or block diagrams.

Moreover, these computer program instructions may also be stored in a computer-readable memory capable of directing a computer or other programmable data processing apparatus to operate in a specific manner, such that the instructions stored in the computer-readable memory produce an article of manufacture including instruction means which implement the functions specified in one flow or multiple flows and/or one block or multiple blocks in the schematic diagrams and/or block diagrams.

These computer program instructions may also be loaded onto a computer or other programmable data processing apparatus to cause a series of operational processes to be performed on the computer or other programmable apparatus to produce a computer-implemented process, such that the instructions executed on the computer or other programmable apparatus provide processes for implementing the functions specified in one flow or multiple flows and/or one block or multiple blocks in the schematic diagrams and/or block diagrams.

What is described above is merely an example of the present disclosure and is not used to limit the present disclosure. For those skilled in the art, the present disclosure may be subject to various modifications and variations. Any modifications, equivalent substitutions, improvements, etc., made within the spirit and principle of the present disclosure, should be included within the scope of the claims of the present disclosure.

What is claimed is:

1. A method for decompression backup, implemented to a provider edge (PE) apparatus designated as a compression node in a data center, wherein the method comprises:

identifying a first packet matching a master flow specification policy corresponding to a master decompression node;

compressing the first packet into a first compressed packet based on the master flow specification policy;

redirecting the first compressed packet to an interface between the compression node and the master decompression node to forward the first compressed packet to the master decompression node for decompression;

in response to determining that a notification indicating that a decompression capability of the master decompression node is abnormal is received, identifying a second packet matching a new master flow specification policy corresponding to a new master decompression node;

compressing the second packet based on the new master flow specification policy to obtain a second compressed packet, and redirecting the second compressed packet to an interface between the compression node and the new master decompression node to forward the second compressed packet to the new master decompression node for decompression.

2. The method of claim 1, wherein prior to the identifying the first packet matching the master flow specification policy corresponding to the master decompression node, the method further comprises:

receiving flow specification policies respectively sent by a plurality of decompression nodes; wherein the flow specification policy sent by each decompression node is to instruct the compression node to compress packets matching the flow specification policy and redirect the packets to the decompression node for decompression; and selecting one from the plurality of decompression nodes as the master decompression node, and taking other decompression nodes as backup decompression nodes of the master decompression node;

wherein the flow specification policy corresponding to the master decompression node is the master flow specification policy.

3. The method of claim 2, wherein prior to the identifying the first packet matching the master flow specification policy corresponding to the master decompression node, the method further comprises:

generating a master flow specification route based on the master flow specification policy and configuring the master flow specification route to local hardware; wherein the master flow specification route is to guide the compression node to compress the first packet into the first compressed packet by using the master flow specification route and redirect the first compressed packet to the interface between the compression node and the master decompression node, so as to forward the first compressed packet to the master decompression node for decompression;

wherein the identifying the first packet matching the master flow specification policy corresponding to the master decompression node comprises: identifying the first packet matching the master flow specification route; and wherein the compressing the first packet into the first compressed packet based on the master flow specification policy comprises: compressing the first packet based on the master flow specification route to obtain the first compressed packet.

4. The method of claim 3, wherein the method further comprises:

generating backup flow specification routes corresponding to the backup decompression nodes based on the flow specification policies corresponding to the backup decompression nodes;

wherein the identifying the second packet matching the new master flow specification policy corresponding to the new master decompression node comprises:

selecting one from the backup decompression nodes as the new master decompression node, wherein the backup flow specification route corresponding to the selected backup decompression node is designated as the new master flow specification route corresponding to the new master decompression node;

configuring the new master flow specification route to the local hardware to replace the master flow specification route; and identifying the second packet matching the new master flow specification route; and wherein the compressing the second packet based on the new master flow specification policy to obtain the second compressed packet comprises:

compressing the second packet based on the new master flow specification route to obtain the second compressed packet.

5. The method of claim 4, wherein each of the master flow specification route and the new master flow specification route comprises a compression policy and a redirection policy;

wherein the compression policy has a compression operation matching rule and instructs compressing packets matching the compression operation matching rule; and wherein the redirection policy has a redirection operation matching rule and instructs redirecting compressed packets matching the redirection operation matching rule to the interface between the compression node and the master decompression node.

6. The method of claim 5, wherein the compression operation matching rule comprises a first protocol identifier, and the redirection operation matching rule comprises a second protocol identifier, which is different from the first protocol identifier and is an identifier of a compression protocol.

7. The method of claim 5, wherein:

the compression operation matching rules, which are comprised in the flow specification route corresponding to the master decompression node and the flow specification routes corresponding to the backup decompression nodes, are the same;

the redirection operation matching rules, which are comprised in the flow specification route corresponding to the master decompression node and the flow specification routes corresponding to the backup decompression nodes, are the same;

the redirection policy redirects to an interface; and different redirection policies redirect to different interfaces.

8. The method of claim 5, wherein:

the compressing the first packet into the first compressed packet based on the master flow specification route comprises:

determining that the first packet matches the compression operation matching rule in the master flow specification route, and compressing the first packet to obtain the first compressed packet; and the redirecting the first compressed packet to the interface between the compression node and the master decompression node to forward the first compressed packet to the master decompression node for decompression comprises:

in response to determining that the first compressed packet matches the redirection operation matching rule in the master flow specification route, redirecting the first compressed packet to the interface between the compression node and the master decompression node based on the redirection policy in the master flow specification route, so that the first compressed packet is sent to the master decompression node.

9. A method for decompression backup, implemented to a provider edge (PE) apparatus in a data center, the PE apparatus being designated as one of decompression nodes adapted to a compression node, wherein the method comprises:

determining that a present decompression node is selected by the compression node as a master decompression node;

in response to determining that a decompression capability of the present decompression node is normal, receiving a first compressed packet redirected by the compression node and decompressing the first compressed packet; wherein the compression node is a node which compresses a first packet matching a flow specification policy corresponding to the master decompression node into the first compressed packet and redirects the first compressed packet to the master decompression node; and in response to determining that the decompression capability of the present decompression node is abnormal, notifying the compression node, so that the compression node compresses a second packet, which matches a flow specification policy corresponding to a new master decompression node, into a second compressed packet and redirects the second compressed packet to an interface between the compression node and the new master decompression node so as to forward the second compressed packet to the new master decompression node for decompression.

10. The method of claim 9, wherein prior to the determining the present decompression node is selected by the compression node as the master decompression node, the method further comprises:

sending a local flow specification policy to the compression node.

11. An electronic device, implemented to a provider edge (PE) apparatus designated as a compression node in a data center, comprising: a processor and a non-transitory machine-readable storage medium for storing computer instructions, wherein the computer instructions are executed by the processor to execute operations comprising:

identifying a first packet matching a master flow specification policy corresponding to a master decompression node;

compressing the first packet into a first compressed packet based on the master flow specification policy;

redirecting the first compressed packet to an interface between the compression node and the master decompression node to forward the first compressed packet to the master decompression node for decompression;

in response to determining that a notification indicating that a decompression capability of the master decompression node is abnormal is received, identifying a second packet matching a new master flow specification policy corresponding to a new master decompression node;

compressing the second packet based on the new master flow specification policy to obtain a second compressed packet, and redirecting the second compressed packet to an interface between the compression node and the new master decompression node to forward the second compressed packet to the new master decompression node for decompression.

12. The electronic device of claim 11, wherein prior to the identifying the first packet matching the master flow specification policy corresponding to the master decompression node, the operations further comprise:

receiving flow specification policies respectively sent by a plurality of decompression nodes; wherein the flow specification policy sent by each decompression node is to instruct the compression node to compress packets matching the flow specification policy and redirect the packets to the decompression node for decompression; and selecting one from the plurality of decompression nodes as the master decompression node, and taking other decompression nodes as backup decompression nodes of the master decompression node;

wherein the flow specification policy corresponding to the master decompression node is the master flow specification policy.

13. The electronic device of claim 12, wherein prior to the identifying the first packet matching the master flow specification policy corresponding to the master decompression node, the operations further comprise:

generating a master flow specification route based on the master flow specification policy and configuring the master flow specification route to local hardware; wherein the master flow specification route guides the compression node to compress the first packet into the first compressed packet by using the master flow specification route and redirect the first compressed packet to the interface between the compression node and the master decompression node, so as to forward the first compressed packet to the master decompression node for decompression;

wherein the identifying the first packet matching the master flow specification policy corresponding to the master decompression node comprises: identifying the first packet matching the master flow specification route; and wherein the compressing the first packet into the first compressed packet based on the master flow specification policy comprises: compressing the first packet based on the master flow specification route to obtain the first compressed packet.

14. The electronic device of claim 13, wherein the operations further comprise:

generating backup flow specification routes corresponding to the backup decompression nodes based on the flow specification policies corresponding to the backup decompression nodes;

wherein the identifying the second packet matching the new master flow specification policy corresponding to the new master decompression node comprises:

selecting one from the backup decompression nodes as the new master decompression node, wherein the backup flow specification route corresponding to the selected backup decompression node is designated as the new master flow specification route corresponding to the new master decompression node;

configuring the new master flow specification route to the local hardware to replace the master flow specification route; and identifying the second packet matching the new master flow specification route; and wherein the compressing the second packet based on the new master flow specification policy to obtain the second compressed packet comprises:

compressing the second packet based on the new master flow specification route to obtain the second compressed packet.

15. The electronic device of claim 14, wherein each of the master flow specification route and the new master flow specification route comprises a compression policy and a redirection policy;

wherein the compression policy has a compression operation matching rule and instructs compressing packets matching the compression operation matching rule; and wherein the redirection policy has a redirection operation matching rule and instructs redirecting compressed packets matching the redirection operation matching rule to the interface between the compression node and the master decompression node.

16. The electronic device of claim 15, wherein the compression operation matching rule comprises a first protocol identifier, and the redirection operation matching rule comprises a second protocol identifier, which is different from the first protocol identifier and is an identifier of a compression protocol.

17. The electronic device of claim 15, wherein:

the compression operation matching rules, which are comprised in the flow specification route corresponding to the master decompression node and the flow specification routes corresponding to the backup decompression nodes, are the same;

the redirection operation matching rules, which are comprised in the flow specification route corresponding to the master decompression node and the flow specification routes corresponding to the backup decompression nodes, are the same;

the redirection policy redirects to an interface; and different redirection policies redirect to different interfaces.

18. The electronic device of claim 15, wherein:

the compressing the first packet into the first compressed packet based on the master flow specification route comprises:

determining that the first packet matches the compression operation matching rule in the master flow specification route, and compressing the first packet to obtain the first compressed packet; and the redirecting the first compressed packet to the interface between the compression node and the master decompression node to forward the first compressed packet to the master decompression node for decompression comprises:

in response to determining that the first compressed packet matches the redirection operation matching rule in the master flow specification route, redirecting the first compressed packet to the interface between the compression node and the master decompression node based on the redirection policy in the master flow specification route, so that the first compressed packet is sent to the master decompression node.

19. An electronic device, implemented to a provider edge (PE) apparatus designated as one of decompression nodes adapted to a compression node in a data center, comprising: a processor and a non-transitory machine-readable storage medium for storing computer instructions, wherein the computer instructions are executed by the processor to execute the method according to claim 9.

* * * * *